US009645692B2

(12) United States Patent
Bruwer

(10) Patent No.: US 9,645,692 B2
(45) Date of Patent: *May 9, 2017

(54) USER INTERFACE WITH PROXIMITY SENSING

(71) Applicant: GLOBAL TOUCH SOLUTIONS, LLC, Vienna, VA (US)

(72) Inventor: Frederick Johannes Bruwer, Paarl (ZA)

(73) Assignee: GLOBAL TOUCH SOLUTIONS, LLC, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,766

(22) Filed: Nov. 19, 2015

(65) Prior Publication Data

US 2016/0070390 A1 Mar. 10, 2016

Related U.S. Application Data

(63) Continuation of application No. 13/195,877, filed on Aug. 2, 2011, now Pat. No. 9,226,376, which is a (Continued)

(51) Int. Cl.
*G09G 5/00* (2006.01)
*G06F 3/044* (2006.01)
(Continued)

(52) U.S. Cl.
CPC ............ *G06F 3/044* (2013.01); *H05B 37/02* (2013.01); *H05B 37/0245* (2013.01);
(Continued)

(58) Field of Classification Search
CPC .................................................... H05B 39/085
(Continued)

(56) References Cited

U.S. PATENT DOCUMENTS 4,039,940 A 8/1977 Butler et al.
4,053,789 A 10/1977 Schultz
(Continued)

FOREIGN PATENT DOCUMENTS

CN 2042562 8/1989
CN 2129500 Y 4/1993
WO 00/22890 A2 4/2000

OTHER PUBLICATIONS

Institution Decision of IPR2015-01175 dated Nov. 17, 2005.
(Continued)

*Primary Examiner* — Thuy Vinh Tran
(74) *Attorney, Agent, or Firm* — Sughrue Mion, PLLC

(57) ABSTRACT

An electronic circuit including a microchip for use as an intelligent user interface also comprises touch sensor technology that differentiates between proximity and physical contact events to activate and control various loads including light bulbs, products with radio frequency circuitry or electric motors. An input to the microchip is connected to a switch or sensing structure that does not form a serial link between the power source and the load. The electronic circuit controls various functions in response to user actions including automatic delayed shut-off functions, find-in-the-dark indicator and power source level/product state indications. The microchip allows the user to select specific functions based on the time duration of activation signals, the time duration between activation signals and the number of activation signals at the input. The microchip is further configured to interpret and react to the signals received from a user in a way that enhances ease of use of the product and to use the indicators to provide information to the user that is influenced by the signals received as well as the state of the product.

31 Claims, 6 Drawing Sheets

Related U.S. Application Data continuation of application No. 12/849,093, filed on Aug. 3, 2010, now Pat. No. 8,035,623, which is a continuation of application No. 11/785,063, filed on Apr. 13, 2007, now Pat. No. 7,772,781, which is a continuation of application No. 10/961,373, filed on Oct. 12, 2004, now Pat. No. 7,265,494, which is a continuation-in-part of application No. 09/806,860, filed as application No. PCT/ZA99/00107 on Oct. 8, 1999, now Pat. No. 6,984,900, and a continuation-in-part of application No. 09/169,395, filed on Oct. 9, 1998, now Pat. No. 6,249,089.

(51) Int. Cl.
*H05B 37/02* (2006.01)
*H05B 39/04* (2006.01)
*H05B 39/08* (2006.01)

(52) U.S. Cl.
CPC ....... H05B 37/0281 (2013.01); H05B 39/041 (2013.01); H05B 39/044 (2013.01); H05B 39/085 (2013.01); *G06F 2203/04101* (2013.01); *Y02B 20/42* (2013.01); *Y02B 20/48* (2013.01); *Y10T 307/735* (2015.04); *Y10T 307/766* (2015.04); *Y10T 307/786* (2015.04)

(58) Field of Classification Search
USPC ......... 315/129, 136; 116/200, 205; 307/125, 307/126, 139, 140, 141; 345/156, 173
See application file for complete search history.

(56) References Cited

U.S. PATENT DOCUMENTS

| | | | |
|---|---|---|---|
| 4,123,631 A | 10/1978 | Lewis | |
| 4,198,539 A | 4/1980 | Pepper, Jr. | |
| 4,293,734 A | 10/1981 | Pepper, Jr. | |
| 4,371,746 A | 2/1983 | Pepper, Jr. | |
| 4,476,463 A | 10/1984 | Ng et al. | |
| 4,535,254 A * | 8/1985 | Khatri ...................... | A61F 4/00 307/114 |
| 4,550,221 A | 10/1985 | Mabusth | |
| 4,622,437 A | 11/1986 | Bloom et al. | |
| 4,677,308 A * | 6/1987 | Wroblewski .......... | B60R 16/027 307/10.1 |
| 4,758,735 A | 7/1988 | Ingraham | |
| 4,764,708 A | 8/1988 | Roudeski | |
| 4,766,368 A | 8/1988 | Cox | |
| 4,806,709 A | 2/1989 | Evans | |
| 4,878,107 A | 10/1989 | Hopper | |
| 4,879,461 A | 11/1989 | Philipp | |
| 5,018,082 A | 5/1991 | Obata et al. | |
| 5,036,321 A | 7/1991 | Leach et al. | |
| 5,045,644 A | 9/1991 | Dunthorn | |
| 5,138,538 A * | 8/1992 | Sperling ................... | F21L 4/00 200/60 |
| 5,194,819 A | 3/1993 | Briefer | |
| 5,231,381 A | 7/1993 | Duwaer | |
| 5,305,017 A | 4/1994 | Gerpheide | |
| 5,311,175 A | 5/1994 | Waldman | |
| 5,327,161 A | 7/1994 | Logan et al. | |
| 5,418,433 A | 5/1995 | Nilssen | |
| 5,426,732 A | 6/1995 | Boies et al. | |
| 5,477,129 A | 12/1995 | Myslinski | |
| 5,485,058 A | 1/1996 | Watson et al. | |
| 5,495,077 A | 2/1996 | Miller et al. | |
| 5,542,591 A | 8/1996 | Moore et al. | |
| 5,579,033 A | 11/1996 | Rutledge et al. | |
| 5,621,283 A | 4/1997 | Watson et al. | |
| 5,626,052 A | 5/1997 | Lawson | |
| 5,646,535 A | 7/1997 | Dornier | |
| 5,648,642 A | 7/1997 | Miller et al. | |
| 5,650,591 A | 7/1997 | Matsushita et al. | |
| 5,710,728 A | 1/1998 | Danielson et al. | |
| 5,712,795 A | 1/1998 | Layman et al. | |
| 5,730,165 A * | 3/1998 | Philipp .................... | E03C 1/057 137/1 |
| 5,767,457 A | 6/1998 | Gerpheide et al. | |
| 5,825,352 A | 10/1998 | Bisset et al. | |
| 5,844,506 A | 12/1998 | Binstead | |
| 5,894,580 A | 4/1999 | Yoshida | |
| 5,898,290 A | 4/1999 | Beard et al. | |
| 5,898,292 A | 4/1999 | Takemoto et al. | |
| 5,914,465 A | 6/1999 | Allen et al. | |
| 5,917,165 A | 6/1999 | Platt et al. | |
| 5,920,309 A | 7/1999 | Bisset et al. | |
| 5,955,869 A | 9/1999 | Rathmann | |
| 5,988,902 A | 11/1999 | Holehan | |
| 6,125,286 A | 9/2000 | Jahagirdar et al. | |
| 6,137,427 A | 10/2000 | Binstead | |
| 6,246,862 B1 | 6/2001 | Grivas et al. | |
| 6,249,130 B1 | 6/2001 | Greer | |
| 6,288,707 B1 | 9/2001 | Philipp | |
| 6,304,091 B1 | 10/2001 | Shahoian et al. | |
| 6,323,846 B1 | 11/2001 | Westerman et al. | |
| 6,377,009 B1 | 4/2002 | Philipp | |
| 6,452,514 B1 | 9/2002 | Philipp | |
| 6,466,036 B1 * | 10/2002 | Philipp .................... | G01D 5/24 324/658 |
| 6,480,052 B1 | 11/2002 | Pettersen | |
| 6,492,979 B1 | 12/2002 | Kent et al. | |
| 6,498,600 B1 | 12/2002 | Vance et al. | |
| 6,501,463 B1 | 12/2002 | Dahley et al. | |
| 6,535,200 B2 | 3/2003 | Philipp | |
| 6,549,193 B1 | 4/2003 | Huang et al. | |
| 6,583,632 B2 | 6/2003 | Von Basse et al. | |
| 6,583,676 B2 | 6/2003 | Krah et al. | |
| 6,630,929 B1 | 10/2003 | Adler et al. | |
| 6,630,941 B1 | 10/2003 | Addison | |
| 6,680,677 B1 | 1/2004 | Tiphane | |
| 6,731,209 B2 | 5/2004 | Wadlow et al. | |
| 6,753,853 B1 | 6/2004 | Dotson | |
| 6,762,752 B2 | 7/2004 | Perski et al. | |
| 6,774,505 B1 | 8/2004 | Wnuk | |
| 6,819,316 B2 | 11/2004 | Schulz et al. | |
| 6,833,729 B2 | 12/2004 | Kim et al. | |
| 6,842,644 B2 | 1/2005 | Anderson et al. | |
| 6,879,930 B2 | 4/2005 | Sinclair et al. | |
| 6,888,076 B2 | 5/2005 | Hetherington | |
| 6,888,536 B2 | 5/2005 | Westerman et al. | |
| 6,943,705 B1 | 9/2005 | Bolender et al. | |
| 6,970,160 B2 | 11/2005 | Mulligan et al. | |
| 6,977,646 B1 | 12/2005 | Hauck et al. | |
| 6,993,607 B2 | 1/2006 | Philipp | |
| 7,002,556 B2 | 2/2006 | Tsukada et al. | |
| 7,002,557 B2 * | 2/2006 | Iizuka ................... | G06F 1/1626 345/173 |
| 7,010,710 B2 | 3/2006 | Piazza | |
| 7,015,705 B2 | 3/2006 | Inaba et al. | |
| 7,019,672 B2 | 3/2006 | Ely | |
| 7,030,860 B1 | 4/2006 | Hsu et al. | |
| 7,034,814 B2 | 4/2006 | Gong et al. | |
| 7,036,504 B2 | 5/2006 | Wallace et al. | |
| 7,129,935 B2 | 10/2006 | Mackey | |
| 7,148,704 B2 | 12/2006 | Philipp | |
| 7,167,093 B2 | 1/2007 | Fergusson | |
| 7,202,859 B1 | 4/2007 | Speck et al. | |
| 7,240,297 B1 | 7/2007 | Anderson et al. | |
| 7,289,102 B2 | 10/2007 | Hinckley et al. | |
| 7,295,190 B2 | 11/2007 | Philipp | |
| 7,346,847 B2 | 3/2008 | Etter et al. | |
| 7,401,296 B2 | 7/2008 | Watanabe et al. | |
| 7,653,883 B2 | 1/2010 | Hotelling et al. | |
| 7,663,607 B2 | 2/2010 | Hotelling et al. | |
| 7,705,834 B2 * | 4/2010 | Swedin ............... | G02F 1/13338 178/18.05 |
| 7,764,274 B2 | 7/2010 | Westerman et al. | |
| 7,781,980 B2 | 8/2010 | Bruwer | |
| 7,852,323 B2 | 12/2010 | Parkinson et al. | |
| RE42,199 E | 3/2011 | Caldwell | |
| 2001/0011995 A1 | 8/2001 | Hinckley et al. | |
| 2001/0044318 A1 | 11/2001 | Mantyjarvi et al. | |

(56) References Cited

U.S. PATENT DOCUMENTS

| | | |
|---|---|---|
| 2002/0030666 A1 | 3/2002 | Philipp |
| 2003/0011579 A1 | 1/2003 | Gong et al. |
| 2003/0067447 A1 | 4/2003 | Geaghan et al. |
| 2004/0104826 A1 | 6/2004 | Philipp |
| 2004/0118872 A1 | 6/2004 | Romanyszyn et al. |
| 2004/0239650 A1 | 12/2004 | Mackey |
| 2005/0041018 A1 | 2/2005 | Philipp |
| 2005/0052429 A1 | 3/2005 | Philipp |
| 2005/0179673 A1 | 8/2005 | Philipp |
| 2005/0219228 A1 | 10/2005 | Alameh et al. |
| 2005/0264304 A1 | 12/2005 | Nakamura et al. |
| 2006/0022955 A1 | 2/2006 | Kennedy |
| 2006/0026521 A1 | 2/2006 | Hotelling et al. |
| 2006/0244733 A1 | 11/2006 | Geaghan |

OTHER PUBLICATIONS

Institution Decision of IPR2015-01151 dated Nov. 17, 2005.
Institution Decision of IPR2015-01174 dated Nov. 17, 2005.
Institution Decision of IPR2015-01150 dated Nov. 17, 2005.
Institution Decision of IPR2015-01173 dated Nov. 17, 2005.
Institution Decision of IPR2015-01149 dated Nov. 17, 2005.
Institution Decision of IPR2015-01172 dated Nov. 17, 2005.
Institution Decision of IPR2015-01171 dated Nov. 17, 2005.
Institution Decision of IPR2015-01148 dated Nov. 17, 2005.
Institution Decision of IPR2015-01147 dated Nov. 17, 2005.
Petition for IPR2015-01928 dated Sep. 24, 2015.
Petition for IPR2016-00221 dated Nov. 19, 2015.
Petition for IPR2016-00158 dated Nov. 10, 2015.
Institution Decision of IPR2015-01023 dated Sep. 28, 2015.
Denial of IPR Institution for IPR2015-01024 dated Sep. 23, 2015.
Denial of IPR Institution for IPR2015-01025 dated Oct. 8, 2015.
Petition for IPR2015-01603 dated Jul. 23, 2015.
Petition for IPR2015-01149 dated May 12, 2015.
Petition for IPR2015-01173 dated May 11, 2015.
Petition for IPR2015-01150 dated May 12, 2015.
Petition for IPR2015-01174 dated May 11, 2015.
Petition for IPR2015-01151 dated May 12, 2015.
Petition for IPR2015-01175 date May 11, 2015.
Petition for IPR2015-01024 dated Apr. 10, 2015.
Petition for IPR2015-01025 dated Apr. 10, 2015.
Petition for IPR2015-01023 dated Apr. 10, 2015.
Petition for IPR2015-01616 dated Jul. 23, 2015.
Petition for IPR2015-01147 dated May 12, 2015.
Petition for IPR2015-01171 dated May 11, 2015.
Petition for IPR2015-01148 dated May 12, 2015.
Petition for IPR2015-01172 dated May 11, 2015.
Communication dated Feb. 19, 2014, issued by the State Intellecutal Property Office, P.R. China in counterpart Chinese Application No. 201210107961.0.
Petition for Inter Partes Review in IPR 7,265,494 dated Jul. 23, 2015.
Petition for Inter Partes Review in IPR 7,498,749 dated Jul. 23, 2015.
Petition for Inter Partes Review in IPR 8,288,952 dated May 12, 2015.
Petition for IPR 201 5-01 61 6.
Petition for IPR 2015-01603.
Petition for IPR 2015-01175.
Petition for IPR 2015-01174.
Petition for IPR 2015-01173.
Petition for IPR 2015-01172.
Petition for IPR 2015-01171.
Petition for IPR 2015-01151.
Petition for IPR 2015-01150.
Petition for IPR 2015-01149.
Petition for IPR 2015-01148.
Petition for IPR 2015-01147.
Petition for IPR 2015-01125.
Petition for IPR 2015-01124.
Petition for IPR 2015-01123.
Petition for IPR 2016-00158.
Final Decision of IPR2015-01175 dated Nov. 16, 2016.
Final Decision of IPR2015-01151 dated Nov. 16, 2016.
Final Decision of IPR2015-01174 dated Nov. 16, 2016.
Final Decision of IPR2015-01150 dated Nov. 16, 2016.
Final Decision of IPR2015-01173 dated Nov. 16, 2016.
Final Decision of IPR2015-01149 dated Nov. 16, 2016.
Final Decision of IPR2015-01172 dated Nov. 16, 2016.
Final Decision of IPR2015-01171 dated Nov. 16, 2016.
Final Decision of IPR2015-01148 dated Nov. 16, 2016.
Final Decision of IPR2015-01147 dated Nov. 16, 2016.
Final Decision of IPR2015-01603 dated Nov. 29, 2016.
Final Decision of IPR2015-01928 dated Dec. 28, 2016.
Final Decision of IPR2015-01616 dated Dec. 28, 2016.

* cited by examiner

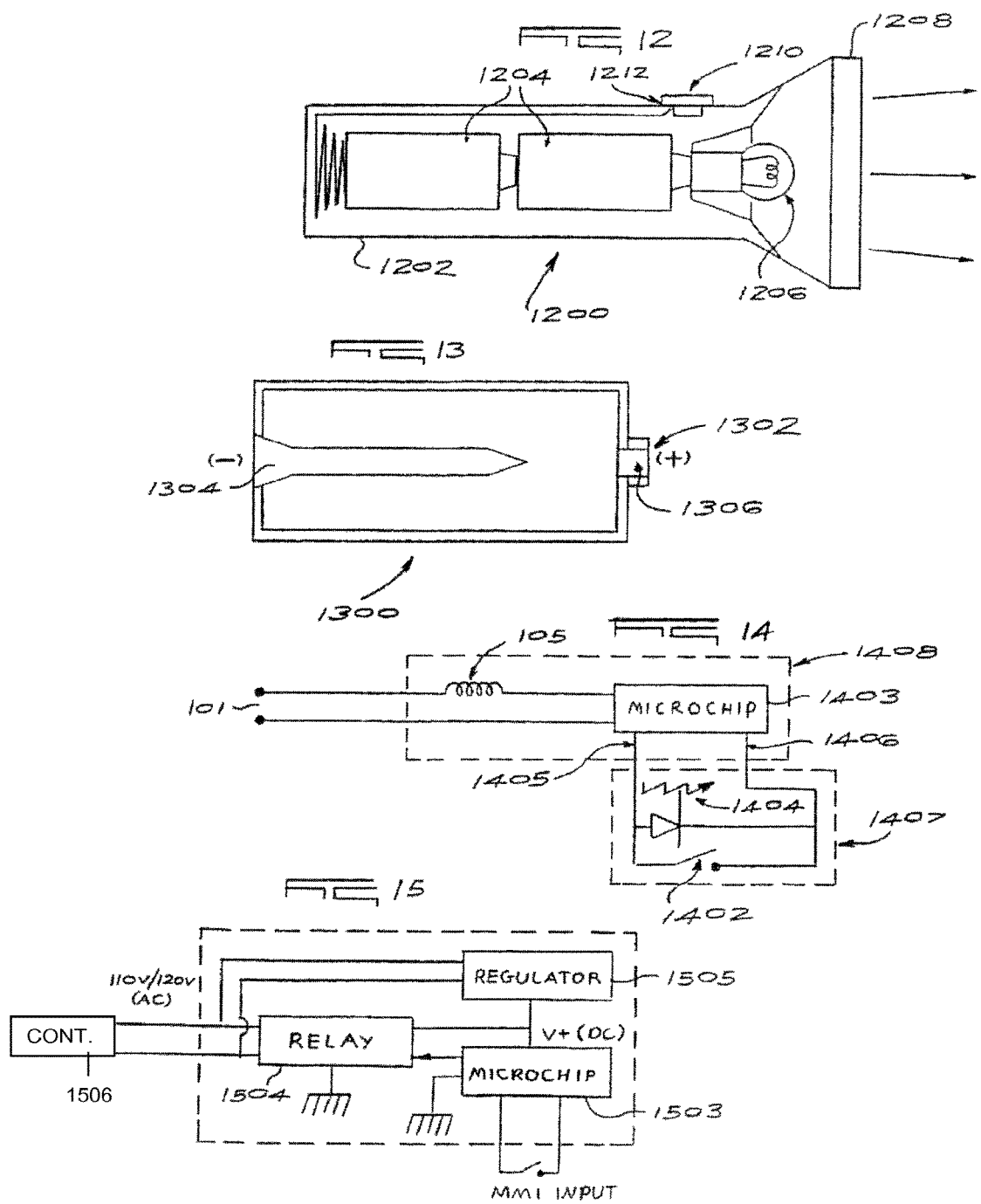

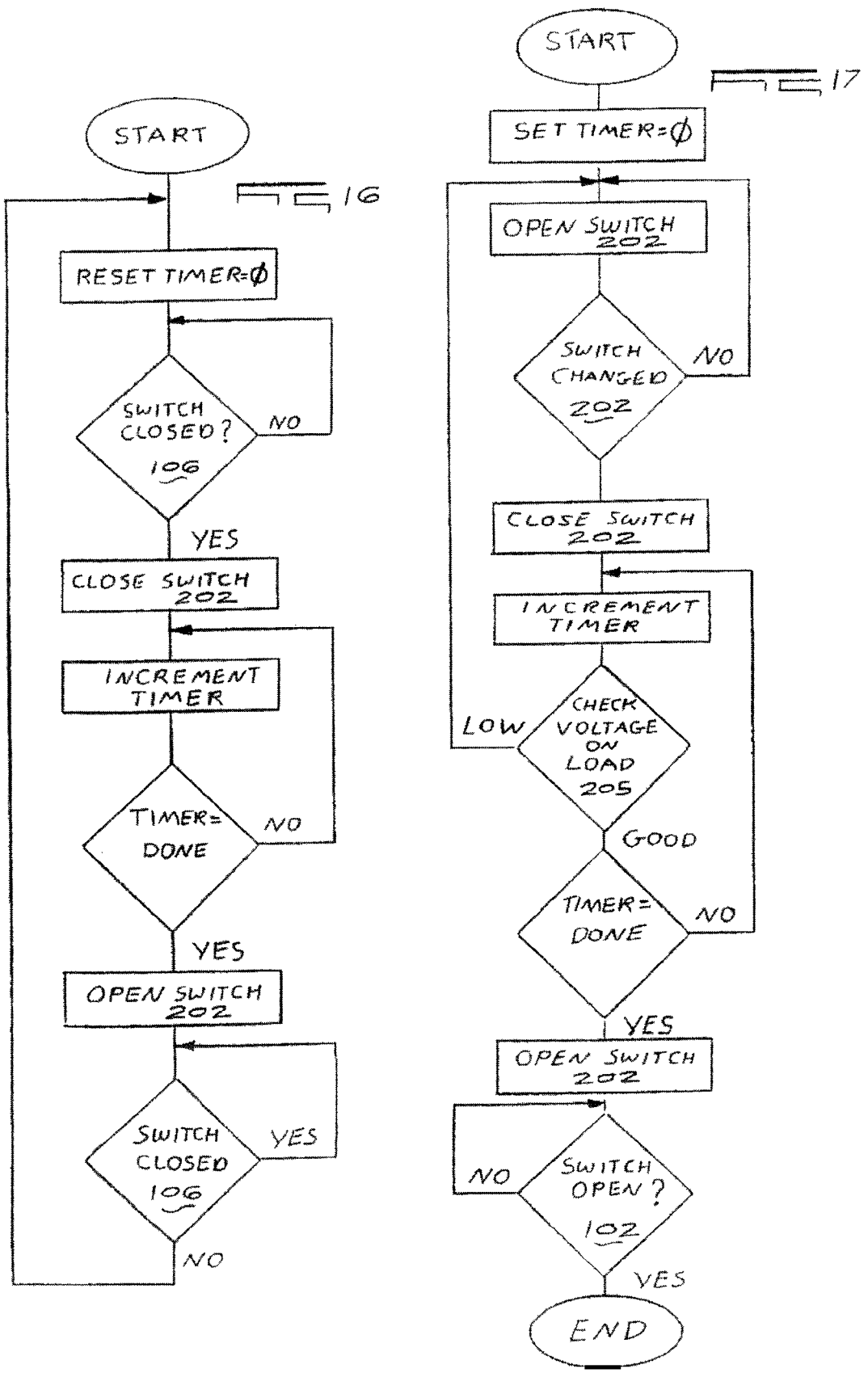

USER INTERFACE WITH PROXIMITY SENSING

CROSS REFERENCE TO RELATED APPLICATIONS

This is a Continuation of application Ser. No. 13/195,877 filed Aug. 2, 2011, now U.S. Pat. No. 9,226,376, which is a Continuation of U.S. application Ser. No. 12/849,093, filed Aug. 3, 2010, now U.S. Pat. No. 8,035,623, which is a Continuation of U.S. application Ser. No. 11/785,063, filed Apr. 13, 2007, now U.S. Pat. No. 7,772,781, which is a Continuation of U.S. application Ser. No. 10/961,373, filed Oct. 12, 2004, now U.S. Pat. No. 7,265,494, which is a Continuation-in-Part of U.S. application ser. No. 09/806,860, filed Jul. 2, 2001, now U.S. Pat. No. 6,984,900, which is a U.S. National Stage of International Application No. PCT/ZA99/00107, filed Oct. 8, 1999, which is a Continuation-in-Part of U.S. application Ser. No. 09/169,395, filed Oct. 9, 1998, now U.S. Pat. No. 6,249,089. The contents of all of which are incorporated herein by reference in their entirety.

FIELD OF THE INVENTION

The present invention relates to new intelligent electrical user interface structures that includes capacitive sensor technology. The invention further relates, in one embodiment, to intelligent switches having embedded therein a microchip for use with a variety of electrical devices to add heretofore unknown functionality to existing electrical devices. The invention also relates, according to another embodiment, user interfaces with capacitive sensing technology that differentiates between proximity and physical contact events in order to achieve a higher level of interpretation of the user actions by the switch and specifically to provide information to the user about the product, the state of the product or guidance towards possible (likely) next actions. In another embodiment, the invention relates to low current switches controlled by microchips of the present invention for use in building lighting systems.

BACKGROUND OF THE INVENTION

In conventional flashlights, manually-operated mechanical switches function to turn the flashlight "on" and "off." When turned "on," battery power is applied through the closed switch to a light bulb; the amount of power then consumed depends on how long the switch is closed. In the typical flashlight, the effective life of the battery is only a few hours at most. Should the operator, after using the flashlight to find his/her way in the dark or for any other purpose, then fail to turn it off, the batteries will, in a very short time, become exhausted. Should the flashlight be left in a turned-on and exhausted condition for a prolonged period, the batteries may then leak and exude corrosive electrolyte that is damaging to the contact which engages the battery terminal as well as the casing of the flashlight.

When the flashlight is designed for use by a young child the likelihood is greater that the flashlight will be mishandled, because a young child is prone to be careless and forgets to turn the flashlight "off" after it has served its purpose. Because of this, a flashlight may be left "on" for days, if not weeks, and as a result of internal corrosion may no longer be in working order when the exhausted batteries are replaced.

Flashlights designed for young children are sometimes in a lantern format, with a casing made of strong plastic material that is virtually unbreakable, the light bulb being mounted within a reflector at the front end of the casing and being covered by a lens from which a light beam is projected. A U-shaped handle is attached to the upper end of the casing, with mechanical on-off slide switch being mounted on the handle, so that a child grasping the handle can readily manipulate the slide actuator with his/her thumb.

With a switch of this type on top of a flashlight handle, when the slide actuator is pushed forward by the thumb, the switch "mechanically" closes the circuit and the flashlight is turned "on" and remains "on" until the slide actuator is pulled back to the "off" position and the circuit is opened. It is this type of switch in the hands of a child that is most likely to be inadvertently left "on."

To avoid this problem, many flashlights include, in addition to a slide switch, a push button switch which keeps the flashlight turned on only when finger pressure is applied to the push button. It is difficult for a young child who wishes, say to illuminate a dark corner in the basement of his home for about 30 seconds, to keep a push button depressed for this period. It is therefore more likely that the child will actuate the slide switch to its permanently-on position, for this requires only a momentary finger motion.

It is known to provide a flashlight with a delayed action switch which automatically turns off after a pre-determined interval. The Mallory U.S. Pat. No. 3,535,282 discloses a flashlight that is automatically turned off by a delayed action mechanical switch assembly that includes a compression spring housed in a bellows having a leaky valve, so that when a switch is turned on manually, this action serves to mechanically compress the bellows which after a pre-determined interval acts to turn off the switch.

A similar delayed action is obtained in a flashlight for children marketed by Playskool Company, this delayed action being realized by a resistance-capacitance timing network which applies a bias to a solid-state transistor switch after 30 seconds or so to cut off the transistor and shut off the flashlight. Also included in the prior art, is a flashlight previously sold by Fisher-Price using an electronic timing circuit to simply turn off the flashlight after about 20 minutes.

It is also known, e.g. as disclosed in U.S. Pat. No. 4,875,147, to provide a mechanical switch assembly for a flashlight which includes a suction cup as a delayed action element whereby the flashlight, when momentarily actuated by an operator, functions to connect a battery power supply to a light bulb, and which maintains this connection for a pre-determined interval determined by the memory characteristics of the suction cup, after which the connection is automatically broken.

U.S. Pat. No. 5,138,538 discloses a flashlight having the usual components of a battery, and on-off mechanical switch, a bulb, and a hand-held housing, to which there is added a timing means and a circuit-breaking means responsive to the timing means for cutting off the flow of current to the bulb, which further has a by-pass means, preferably child-proof, to direct electric current to the light bulb regardless of the state of the timing means. The patent also provides for the operation of the device may be further enhanced by making the by-pass means a mechanical switch connected so as to leave it in series with the mechanical on-off switch. Furthermore, the patent discloses a lock or other "child-proofing" mechanism may be provided to ensure that the by-pass is disabled when the flashlight is switched off.

Most conventional flashlights, like those described above, are actuated by mechanical push or slide button-type switches requiring, of course, mechanical implementation by an operator. Over time, the switch suffers "wear and tear" which impairs operation of the flashlight as a result of, for example, repeated activations by the operator and/or due to the fact that the switch has been left "on" for a prolonged period of time. In addition, such mechanical switches are vulnerable to the effects of corrosion and oxidation and can cause said switches to deteriorate and to become non-functioning. In addition, these prior art devices having these mechanical switches are generally "dumb," i.e. they do not provide the user with convenient, reliable, and affordable functionalities which today's consumers now demand and expect.

The prior art switches typically provide two basic functions in prior art flashlights. First, the mechanical switches act as actual conductors for completing power circuits and providing current during operation of the devices. Depending upon the type of bulb and wiring employed, the intensity of electrical current which must be conducted by the switch is generally quite high leading to, after prolonged use, failure. Second, these mechanical switches must function as an interface between the device and its operator, i.e. the man-machine-interface ("MMI") and necessarily requires repeated mechanical activations of the switch which over time mechanically deteriorate.

Also, currently the electrical switches used in buildings/houses for control of lighting systems are of the conventional type of switches which must conduct, i.e. close the circuit, upon command, thus also providing the MMI. These prior art switches suffer from the same disadvantages as the switches described above in relation to portable electronic devices, like flashlights. Moreover, the switches are relatively dumb in most cases and do not provide the user with a variety of functions, e.g. but not limited to timing means to enable a user, for example, a shop owner or home owner to designate a predetermined shut off or turn on point in time.

There is a need for inexpensive, reliable, and simple intelligent electronic devices which provide increased functionality and energy conservation.

SUMMARY OF THE INVENTION

According to one embodiment of the present invention, there is provided a microchip controlled switch to manage both the current conducting functions and the MMI functions in an electronic device, such as a flashlight, on a low current basis i.e. without the MMI device having to conduct or switch high current. According to one aspect of the invention, the MMI functions are controlled by very low current signals, using touch pads, or carbon coated membrane type switches. These low current signal switches of the present invention can be smaller, more reliable, less costly, easier to seal and less vulnerable to the effects of corrosion and oxidation. Moreover, since the switch is a solid state component, it is, according to the present invention, possible to control the functions of the device in an intelligent manner by the same microchip which provides the MMI functions. Thus, by practicing the teachings of the present invention, more reliable, intelligent, and efficient electrical devices can be obtained which are cheaper and easier to manufacture than prior art devices.

According to another embodiment of the invention, there is provided a microchip which can be embedded in a battery that will lend intelligence to the battery and thus, the device it is inserted into, so that many functions, including but not limited to, delayed switching, dimming, automatic shut off, and intermittent activation may be inexpensively realized in an existing (non intelligent) product, for example a prior art flashlight.

According to a further embodiment, the invention provides a power saving microchip which, when operatively associated with an electronic device, will adjust the average electric current through a current switch, provide an on and off sequence which, for example, but not limited to, in the case of a flashlight, can be determined by an operator and may represent either a flash code sequence or a simple on/off oscillation, provide an indication of battery strength, and/or provide a gradual oscillating current flow to lengthen the life of the operating switch and the power source.

According to one embodiment of the invention, an intelligent flashlight, having a microchip controlled switch is provided comprising a microchip for controlling the on/off function and at least one other function of the flashlight. According to a further embodiment of the invention, an intelligent flashlight having a microchip controlled switch is provided comprising an input means for sending activating/deactivating signals to the microchip, and a microchip for controlling the on/off function and at least one other function of the flashlight. According to a further embodiment of the invention, there is provided an intelligent flashlight having a microchip controlled switch comprising an input means for selecting one function of the flashlight, a microchip for controlling at least the on/off function and one other function of the flashlight, wherein the microchip control circuit may further comprise a control-reset means, a clock means, a current switch, and/or any one or combination of the same.

According to another embodiment of the invention, there is provided a battery for use with an electrical device comprising a microchip embedded in the battery. According to still a further embodiment of the invention, a battery for use with an electronic device is provided comprising a microchip embedded in the battery wherein said microchip is adapted such that an input means external to the microchip can select the on/off function and at least one other function of the electronic device.

According to one embodiment of the present invention, there is provided an intelligent battery for use with an electronic device, the battery having positive and negative terminal ends and comprising a microchip embedded in the battery, preferably in the positive terminal end, for controlling on/off functions and at least one other function of the electronic device.

According to another embodiment of the invention, there is provided a portable microchip device for use in serial connection with a power source, e.g. an exhaustible power source, and an electronic device powered by said source wherein said electronic device has an input means for activating and deactivating said power source, and said microchip comprising a means for controlling the on/off function and at least one other function of the electronic device upon receipt of a signal from said input means through said power source.

According to a still further embodiment of the invention, there is provided a microchip adapted to control lighting in buildings. According to this embodiment, the normal switch on the wall that currently functions as both a power-switch, i.e. conduction of electricity, and MMI can be eliminated, thus eliminating the normal high voltage and high current dangerous wiring to the switch and from the switch to the load or light. Utilizing the present invention, these switches can be replaced with connecting means suitable for low current DC requirements.

According to another embodiment, the present invention is directed to a battery comprising an energy storage section, a processor, e.g. a microchip and first and second terminal ends. The first terminal end being connected to the energy storage section, the second terminal end being connected to the processor, and the processor being connected to the second terminal end and the energy storage section. The processor controls the connection of the second terminal end to the energy storage section.

According to another embodiment, the present invention provides an electronic apparatus which includes an electrical device, comprising a power supply, an activating/deactivating means, and a processor. The activating/deactivating means is connected to the processor and the processor is connected to the power supply. The processor controls the on/off function of the device and at least one other function of the device in response to signals received from the activation/deactivation means.

The present invention, according to a still further embodiment, provides a flashlight comprising a light source, an energy storage means, a switch means, and a processor means. The switch means being in communication with the processor means and the processor means being in communication with the energy storage means which is ultimately in communication with the light source. The processor controls the activation/deactivation of the light source and, in some embodiments, further functions of the flashlight, in response to signals received from the switch means.

While the present invention is primarily described in this application with respect to either a flashlight or a battery therefore, the embodiments discussed herein should not be considered limitative of the invention, and many other variations of the use of the intelligent devices of the present invention will be obvious to one of ordinary skill in the art.

BRIEF DESCRIPTION OF THE DRAWINGS

FIG. 12 is a schematic of a flashlight having therein a microchip controlled switch according to one embodiment of the present invention;

FIG. 13 illustrates a possible position, according to one embodiment of the present invention of a microchip in a battery;

FIG. 14 is a schematic of one embodiment of the present invention of a low current switching device suitable for lighting systems in buildings;

FIG. 15 is a block diagram of one embodiment of the present invention, i.e. microchip 1403 of FIG. 14;

FIG. 16 is a flow diagram for a microchip as shown in FIGS. 4 and 5 for a delayed shut off function embodiment of one embodiment of the present invention; and FIG. 17 is a flow diagram for a microchip as shown in FIGS. 7 and 8a for a delayed shut off function embodiment of one embodiment of the present invention.

DETAILED DESCRIPTION OF THE INVENTION

Figure 1:
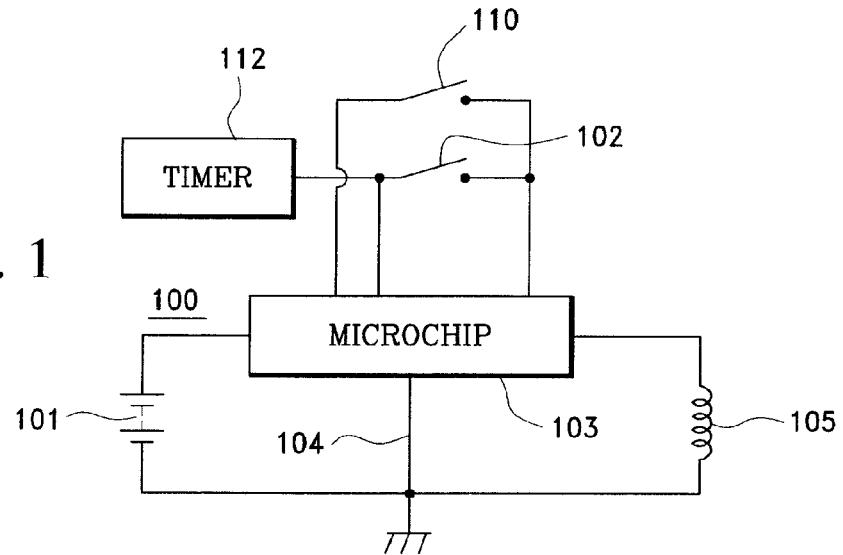
FIG. 1 is a schematic of a device having a microchip controlled push button or sliding type input activation/deactivation switch according to one embodiment of the present invention.

According to one embodiment or aspect of the present invention, and referring to FIG. 1, a schematic depiction of main circuit 100 of an electronic device, for example, a flashlight, is provided, wherein the device has a microchip 103 and a microchip controlled input activator/deactivator 102, for example, a push button or sliding switch. Main circuit 100 of the device is powered by a current supplied by power source 101. Power source 101 may be any power source, e.g. a DC battery, as is well known to those of ordinary skill in the art. While the following discussion is limited to specific electronic devices, that is flashlights, it is to be understood that the following description is equally applicable to other electronic devices including portable radios, toys, for example but not limited to battery operated cars, boats, planes, and/or other electrically powered toys.

Referring to FIG. 1, when an operator activates input push button or sliding command switch 102 to the "on" position, the microchip 103 receives a signal. Switch 102 is a direct electrical input to microchip 103. Microchip 103 is grounded by grounding means 104. Microchip 103 is in series between power source 101 and load 105. Microchip 103 also transfers sufficient power through means of a current switch (not shown in FIG. 1) to load 105 which can be, for example, a resistor-type bulb in the case of a flashlight to provide illumination.

The microchip 103, and other microchips of the present invention, can have its/their intelligence embedded in combinational or sequential logic, a PLA or ROM type structure feeding into a state machine or a true microcontroller type structure. The memory for the above will normally be non-volatile, but should there be a need for selectable options, EE or flash memory structures may be used.

The structure and operational parameters of such a microchip 103 are explained in greater detail below with respect to FIG. 2. As shown in FIG. 1, power is supplied to microchip 103 by power source 101. When an operator activates input switch 102 to the "on" position it represents a command which is communicated to microchip 103. Input means 102 requires very low current in preferred embodiments. In one embodiment of the invention, microchip control/reset means 201 simply allows the current switch 202 to pass current provided from power source 101 to load 105 in an unimpeded manner when the MMI switch 102 is activated, and, in the case of a flashlight, illumination is obtained. It is important to recognize, however, that it is control circuit 201 which activates current switch 202 upon acting on an input from MMI switch 102. Unlike heretofore known prior art devices, activating switch 102 does not conduct current to load 105, but is only a command input mechanism which can, according to the invention, operate on very low current. For example, according to the invention, touch sensor input or carbon coated membrane type switch devices are preferred.

If, for example, an emergency notification function is desired, the flashlight may be designed to alternately flash on and off every second. First, the operator activates input 102 into the appropriate position to indicate such a function is desired. During the "on" segment of the flashing routine, control/reset means 201 commands current switch 202 to close and let current flow through to load 105, thereby causing, in the case of a flashlight, the bulb to illuminate. Simultaneously, control/reset means 201 uses the timing means 203 as a clock for timing. After control/reset means 201 determines one second has elapsed, control/reset means 201 instructs current switch 202 to open and interrupt the current flow through to load 105, and bulb illumination is discontinued. It is important to note that both control/reset means 201 and current switch 202 are still active and fully powered; however, current delivery is now latent with respect to load 105. When another second has elapsed, a command is passed from control/reset means 201 which again allows current to be delivered through current switch 202 to load 105, and in the case of a flashlight, bulb illumination is immediately resumed. The device continues an alternating current delivery routine until either the operator switches the setting of the activating input switch 102 to the "off" position, or until the conditions pre-programmed into the microchip, e.g. into the control/reset means 201, are satisfied and current delivery is permanently discontinued.

Similar operating routines can be employed to generate other conspicuous flashing functions such as the generation of the universal distress signal S.O.S. in Morse code. Again, such a function would require that the microchip, e.g. control/reset means 201, be pre-programmed with the appropriate code for creating such a signal, and to permit current transmission from switch 202 to load 105 in accordance with the code with the assistance of timing means 203. For example, it may be desirable to have an S.O.S. sequence wherein flashes representing each individual letter are separated by time intervals ranging from one-half (½) second to one (1) full second, while the interval between each letter in the code comprises two (2) full seconds. After a certain number of repetitions of the routine, again determined by the operator or as pre-programmed within the microchip, e.g. within the control/reset means 201, the signal is discontinued.

Figure 3:
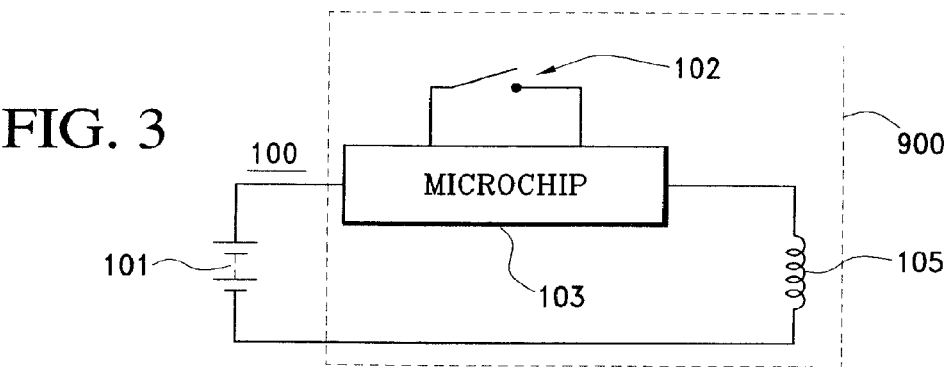
FIG. 3 is a schematic of a second type of intelligent device having a microchip controlled push button or sliding type input activation/deactivation switch according to another embodiment of the invention.

As shown in FIG. 3, it is possible to remove grounding means 104 from main circuit 100. However, it is then necessary to intermittently provide an alternative power source for microchip 103 and to create a virtual ground reference level. A suitable microchip 103 for this configuration is described in greater detail below with respect to FIGS. 8A and 8B.

Figure 4:
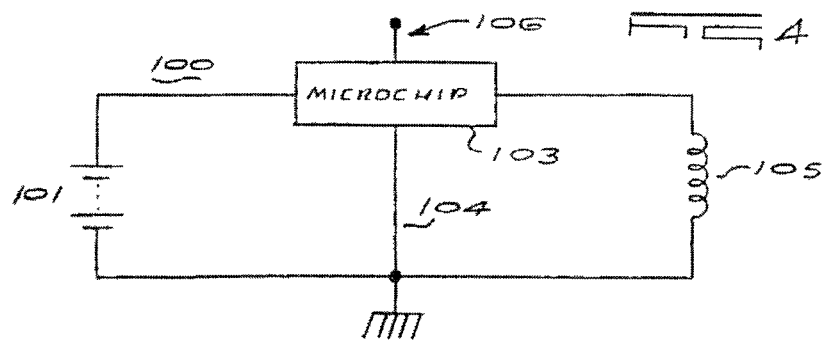
FIG. 4 is a schematic of a device having a microchip controlled touch pad or carbon coated membrane activation/deactivation switch according to a still further embodiment of the invention.

Referring now to FIG. 4, utilizing the circuits in the microchip of some embodiments of the present invention, carbon coated membrane or touch pad type switches are preferred. Carbon coated membrane switches and touch pad switches have many advantages over conventional high current switches, such as those currently used in flashlights. According to the present invention, carbon coated membrane type switches, low current type switches, and touch pad type switches can be used which may be smaller, less costly, easier to seal, and less vulnerable to corrosion and oxidation than conventional switches which also transfer energy or current to the load. Moreover, according to one embodiment of the present invention, carbon coated membrane type switches, touch pad switches, or low current type switches can be formed structurally integral with the product, for example, with the casing of a flashlight.

Figure 5:
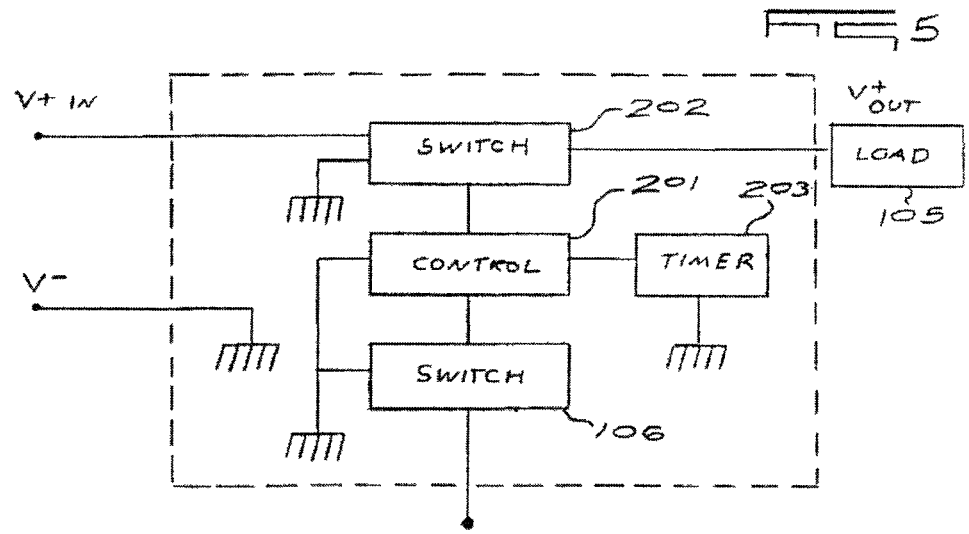
FIG. 5 is a block diagram of a microchip for use in association with a touch pad or carbon coated membrane activation/deactivation switch according to one embodiment of the invention.

A block diagram showing microchip 103 for use, in accordance with one embodiment of the present invention, in association with a carbon coated membrane, a touch pad switch, or a low current type switch 106 is now explained in greater detail in respect to FIG. 5. According to this one embodiment of the present invention, current switch 202 is powered directly by grounded power source 101. However, output of current from current switch 202 to load 105 is dependent on control/reset means 201. When an operator depresses touch pad 106, carbon coated membrane switch 106 or low current type switch 106, control/reset means 201 allows current switch 202 to flow current through to load 105. However, in more intelligent applications according to certain embodiments of the present invention, control/reset means 201 will coordinate, based on clock and/or timing means 203, to execute timing routines similar to those described above such as, but not limited to, intermittent flashing, the flashing of a conspicuous pattern such as Morse code, dimming functions, battery maintenance, battery strength/level, etc.

FIG. 16 is a flow diagram for a microchip 103 as shown in FIGS. 4 and 5 and provides a delayed shutoff function. The flow sequence commences at START when the power source 101 is connected to the microchip 103, as shown in FIG. 4. The sequence of operation is substantially self-explanatory and is not further elaborated herein.

Figure 6:
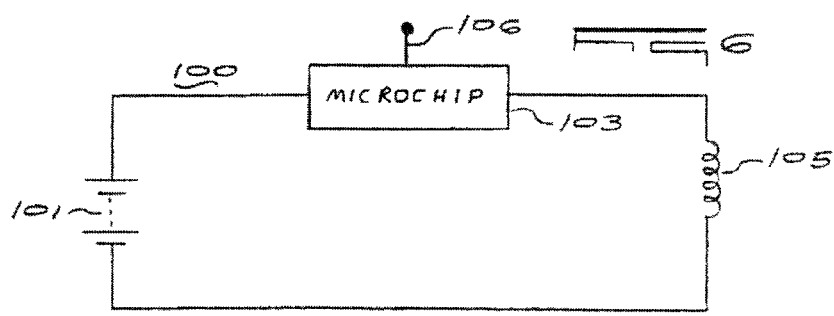
FIG. 6 is a schematic of a second type of device having a microchip controlled touch pad or carbon coated membrane activation/deactivation switch according to one embodiment of the invention.

As shown in FIG. 6, grounding means 104 can be removed from the system as a matter of design choice. A more detailed description of a suitable microchip 103 for this type of configuration is provided below with respect to FIGS. 8A and 8B.

Figure 7:
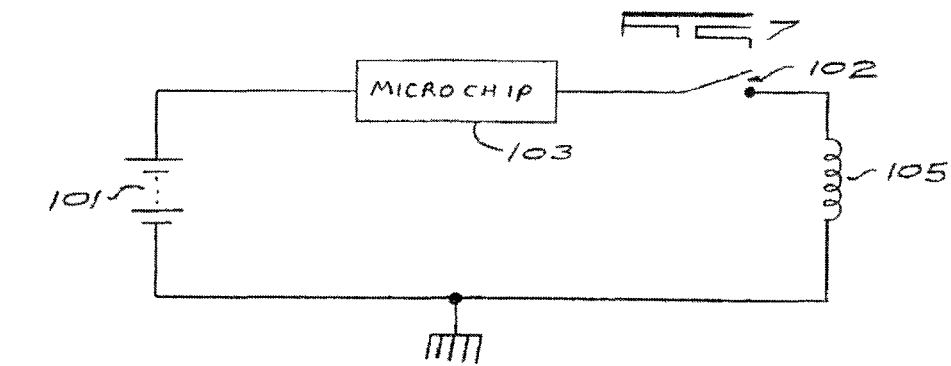
FIG. 7 is a schematic of a battery having embedded therein a microchip according to a further embodiment of the invention.

Referring to FIG. 7, certain embodiments of the present invention also provide for a battery having a microchip embedded for use in association with an electronic device. As shown, direct current is provided to microchip 103 by power source 101. When activating input switch 102 is closed, current is complete and power is transferred to load 105 at the direction of microchip 103. Microchip 103 embedded in the battery can have any number of intelligent functions pre-programmed therein, such as, for example but not limited to, battery strength monitoring, recharging, adjustment of average current through a current switch, intermittent power delivery sequences, and so on. Examples of suitable microchips 103 for this type of application are discussed below with reference to FIGS. 8A and 8B.

Figure 8A:
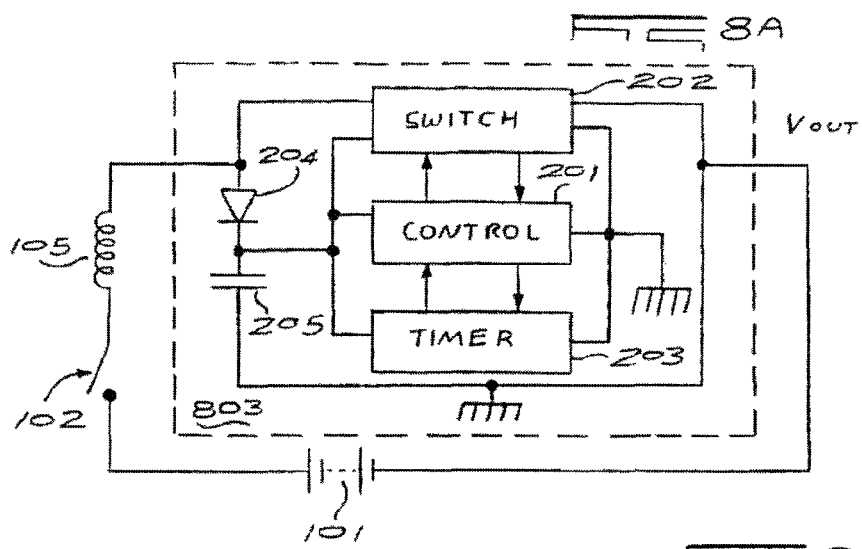
FIG. 8A is a block diagram of a microchip for use in a battery according to one embodiment of the present invention.
Figure 8B:
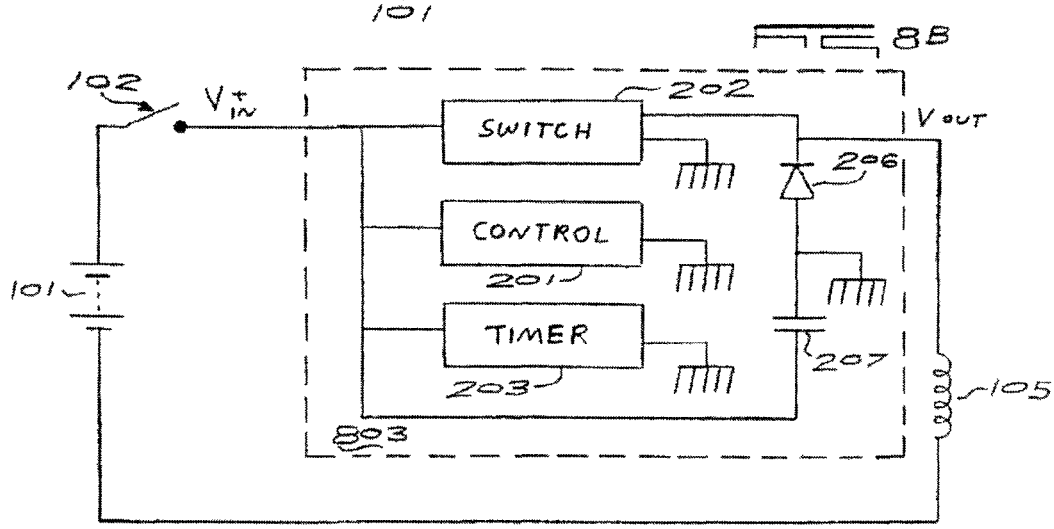
FIG. 8B is a block diagram of a second type of microchip for use in a battery according to another embodiment of the present invention.

FIGS. 8A and 8B are block diagrams of two different further embodiments of the present invention. Microchip 803 is especially suitable for applications wherein microchip 803 is not grounded through the body of the electrical device or where a ground cannot otherwise be established because of design considerations. This embodiment is useful to provide sufficient operating power to the microchip and can be achieved by periodically opening and closing current switch 202 when activation input switch 102 is closed. For example, referring to FIG. 8A, when input switch 102 is closed but current switch 202 does not conduct (that is, the switch is open and does not allow current to flow to load 105), then voltage drop over load 105 is zero and in the case of a flashlight, no illumination is provided from the bulb. Instead, the full voltage drop is over current switch 202 and in parallel with the diode 204 and capacitor 205. Once capacitor 205 becomes fully charged, current switch 202 can close and circuit 103 will be powered by capacitor 205. When circuit 803 is adequately powered, it functions in a manner identical to the circuits described previously with respect to the functions provided by control/reset means 201 and timing means 203.

When the charging capacitor 205 starts to become depleted, control/reset means 201 will recognize this state and reopen the current switch 203, thus briefly prohibiting the flow of current to load 105, in order to remove the voltage drop from load 105 and allow capacitor 205 to recharge and begin a new cycle. In a flashlight application, the time period wherein current flow from current switch 202 is discontinued can be such that the dead period of the light is not easily or not at all detectable by the human eye. In the case of a high current usage load, such as a flashlight, it means the ratio of the capacitance of the capacitor having to power the microchip and the current consumption of the microchip, must be such that the capacitor can power the microchip for a long time relative to the charging time (202 open). This will enable the flashlight's "off" time to be short and the "on" time to be long, thus not creating a detectable or intrusive switching of the flashlight to the user.

FIG. 17 is a flow diagram for a microchip as shown in FIGS. 7 and 8 which also provides a delayed shutoff function. The flow diagram is substantially self-explanatory and the flow sequence commences at START when closure of the switch 102 takes place from an open position.

Figure 11:
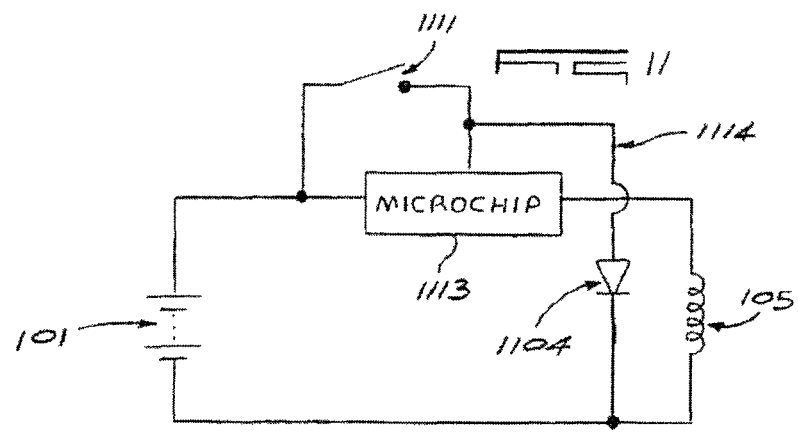
FIG. 11 is a schematic of a device having a microchip controlled switch according to one embodiment of the present invention.

According to another embodiment of the present invention, e.g. in relation to another product of low current consumption, such as a FM radio, the designer may opt for a capacitive (reservoir) device externally to the microchip (see FIG. 11). In this case, the electrical device may function for a time longer than the time required for charging the capacitor (205, 207) which is when the current switch (202) is open and not conducting current.

According to another embodiment of the present invention, an output may be provided to indicate a condition, e.g. a battery is in good or bad condition. It may also be suitable to assist in locating a device, e.g. but not limited to a flashlight, in the dark. This may be a separate output pin or may be, according to another embodiment, shared with the MMI switch input. (See FIG. 11) This output or indicator may be a LED. Referring to FIG. 11, indicator/output device 1104 may, for example, be an LED. When microchip 1113 pulls the line 1114 to high, the LED 1104 shines. LED 1104 may also shine when switch 1111 is closed by the user. However, since that is only a momentary closure, this should not create a problem.

According to a further specific embodiment of the invention, referring to FIG. 11, microchip 1113 can activate the LED 1104 for a short time, e.g. for 100 milliseconds, every 10 seconds. This indication will let potential users know the device is in a good state of functionality and will enable fast location of the device in the dark, e.g. in times of emergency. The low duty cycle will also prevent unnecessary battery depletion.

With an alternative embodiment of the present invention, FIG. 8B illustrates the charging and discharging of capacitor 207 to provide power to circuit 803, wherein the diode and capacitor structure establishes a ground reference for circuit 803.

Each of the embodiments explained with respect to FIGS. 8A and 8B are suitable for use, according to the present invention, depending upon the application. Indeed, the embodiments shown in FIGS. 8A and 8B can be directly embedded into a battery and/or can be separately constructed in another portable structure, e.g. but not limited to, in the shape of a disc, about the size of a quarter, to be inserted at the end of the battery between the output means or positive terminal of the battery and the current receiving structure of the electronic device. As described, the embodiments shown in FIGS. 8A and 8B can be utilized with the prior art high current switches currently being utilized in simple non-intelligent electronic devices, for example flashlights, radios and toys. For example, in the case of a portable simple radio without any intelligence, an automatic shut "off" may be achieved by using the intelligent battery or portable microchip of the present invention having a timing function to automatically shut off the radio after a given period of time, i.e. after the user is asleep.

The architecture of the two embodiments of the present invention shown in FIGS. 8A and 8B provide certain advantages over the simple dumb architecture in current simple electrical devices, for example, flashlights. Due to the unique design of the microchips, as shown in FIGS. 8A and 8B, after the device (into which the microchip is incorporated) is shut off the microchip remains powered for an additional period of time which allows for said microchip to thus receive additional commands, for example, a second "on" activation within a given period after a first "on" and "off" activation, may be programmed into the microchip (control/reset means) to indicate a power reduction or dimming function or any other function as desired by the designer of said device. This is accomplished by the inventive designs of the present invention without having to utilize substantial energy from what are typically small exhaustible power sources, e.g. DC batteries in the case of flashlights.

According to some embodiments of the present invention, more intelligent devices include many other useful functions pre-programmed within the microchip, e.g. in control/reset means 201 and may, e.g. be assisted by a timing means 203. Referring to FIG. 2, commands can be entered through switch 102 in several different ways. First, various time sequences of closed and open activations may represent different commands. For example, but not limited to, a single closure may instruct microchip 103 to activate current switch 202 continuously for a pre-determined length of time. Alternatively, two successive closures may instruct the microchip 103 to intermittently activate current switch 202 for a pre-determined length of time and sequence, for example, a S.O.S. sequence.

Figure 9:
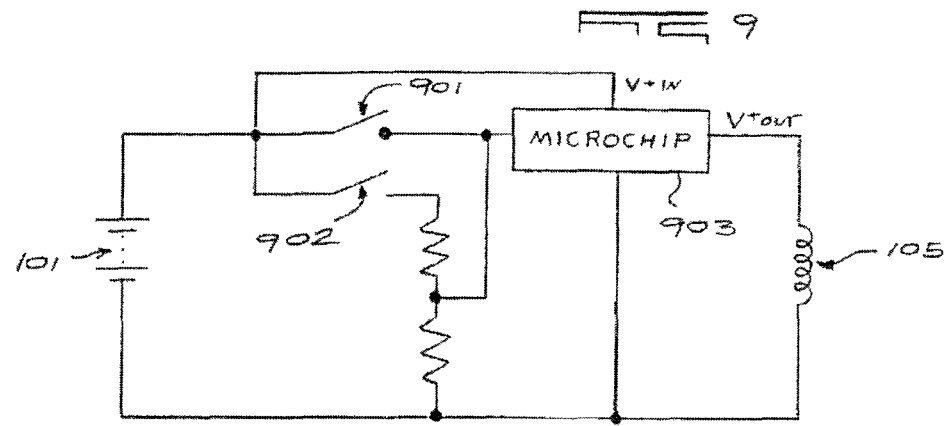
FIG. 9 is a schematic of a device having a microchip controlled switch according to one embodiment of the invention.

Secondly, referring to FIG. 9, commands may be communicated to microchip 903 through the use of various voltages recognizable by microchip 903 to represent various commands. For example, but not limited to, according to one embodiment of the present invention, it may include multiple activating switches 901 and 902 connecting different voltages to the command input structure of microchip 903.

Figure 10:
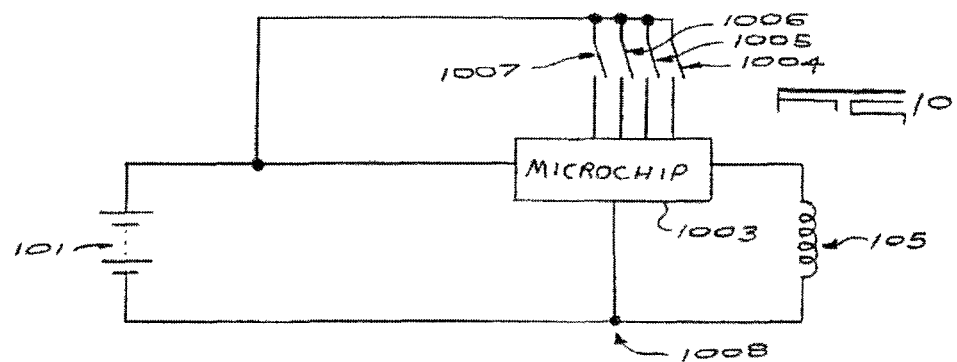
FIG. 10 is a schematic of a device having a microchip controlled switch according to one embodiment of the invention.

Thirdly, referring to FIG. 10, commands may be communicated to microchip 1103 through the use of multiple specific switches (1004, 1005, 1006, 1007) which when activated either singularly or in combination is/are recognizable by microchip 1103 as representing various different commands.

As can be seen by FIG. 9, switch 901 and 902 and in FIG. 10, switches 1004, 1005, 1006, and 1007, power or ground may be used as a command reference voltage level. For example, the switches in FIG. 10 may be connected to another ground instead of point 1008 depending on the internal structure of the microchip.

The control/reset means included in the inventive microchips of the present invention may and in some instances, depending upon the application, should in addition to the many possible user functions described above, include means for adjusting the average current over a switch and/or a means for providing a gradual "on"/"off" current flow, so that the operator does not appreciably perceive the increase and decrease in light provided by the device. These features allow for an ongoing variable level of lighting as desired by an operator, and may also lengthen the life span of the activation switch, the bulb, and the power source. Moreover, several functions can now be added to an existing device, like a flashlight, through the use of a battery having embedded therein a microchip according to the present invention.

In another embodiment of the invention, the microchip is adapted to control lighting in buildings. The normal switch on the wall that currently functions as both a power-switch and MMI can be replaced by a low current switching device like a membrane switch, touch pad or carbon coated switching device. Since very low currents are required by the MMI switch (device) that replaces the normal wall mounted (NC) switch, it is possible to replace the normal high voltage/current (dangerous) wiring to the switch and from the switch to the lead (light), with connectivity means suitable to the new low current DC requirements. As such, in the case of normal A/C wiring (110V/220V), the dangerous wiring can now be restricted to the roof or ceiling and all switches (MMI's) can inherently be safe. This may make the expensive and regulated safety piping required for the wiring of electricity to wall switches redundant.

In a specific embodiment, the traditional wiring between the light and the wall switch is replaced by flexible current conducting tape that can be taped from the roof and down the wall to the required location. In another embodiment, the connections can be made by current conducting paint or similar substances. In both cases above, it can be painted over with normal paint to conceal it. This makes changing the location of a wall switch or the addition of another switch very easy.

The microchip according to the present invention can be located in the power fitting of the light. The microchip having the low current (MMI) input and a power switch to block or transfer the energy to the load (light, fan, air conditioner). It reacts to the inputs received to activate or disable, or control other functions, of whatever device it is controlling.

The microchip may be adapted to contain the high current/voltage switch or control an external switching device or relay. The microchip may also, as in the other embodiments discussed, have some intelligence to control functions like dimming, delayed shut off, timed activation/deactivation, timed cycles, flashing sequences and gradual on/off switching. The microchip may also be adopted, as in a specific flashlight embodiment discussed, to provide a location/emergency signal for lighting/flashing an LED.

FIG. 12 shows a flashlight 1200 with a housing 1202, batteries 1204, a bulb 1206, a reflector and lens 1208, a switch 1210 and a microchip 1212. The flashlight has a conventional appearance but its operation is based on the microchip 1212 controlling the operation of the switch 1210, as described hereinbefore.

FIG. 13 illustrates that a battery 1300 with positive and negative terminals 1302 and 1304 respectively, and of substantially conventional shape and size, can be fabricated with an integral microchip 1306, of the type described hereinbefore. Alternatively the microchip can be mounted to the battery, for example by being inserted into a preformed cavity. As the microchip is inserted into the cavity it makes contact with the positive and negative terminals on the battery. The microchip also carries external terminals so that when the battery is inserted into an appliance (not shown) it makes direct contact with corresponding terminals on the appliance so that the microchip is automatically connected in circuit.

The power input 101 in FIG. 14 may be DC (e.g. 12V) as is commonly used for some lights or A/C (110V or 240V). The device shown as 1403 may be monolithic or be a multichip unit having a relay (solid state or mechanical), a regulator (e.g.: 110 AC volt to 12V DC) and a microchip as discussed in this application.

In a specific embodiment, Ic pin 1406 can normally be high and a closure of input means 1402, e.g. any of the low current switching devices described above, can be detected as Ic pin 1405 also goes too high. To flash the LED 1404 the microchip will reverse the polarities so that Ic pin 1405 becomes high with regards to Ic pin 1406. During this time, it may not be possible to monitor the closure of the input 1402 switch and the LED 1404 may not shine should the input 1402 be closed. In another embodiment, microchip 1403 is able to detect closure of input 1402 before reversing the voltage polarity as discussed and if it detects closure, it does not proceed with reversing the polarity.

Reference 1407 denotes an MMI wall unit, and reference 1408 denotes a high voltage roof unit.

Figure 2:
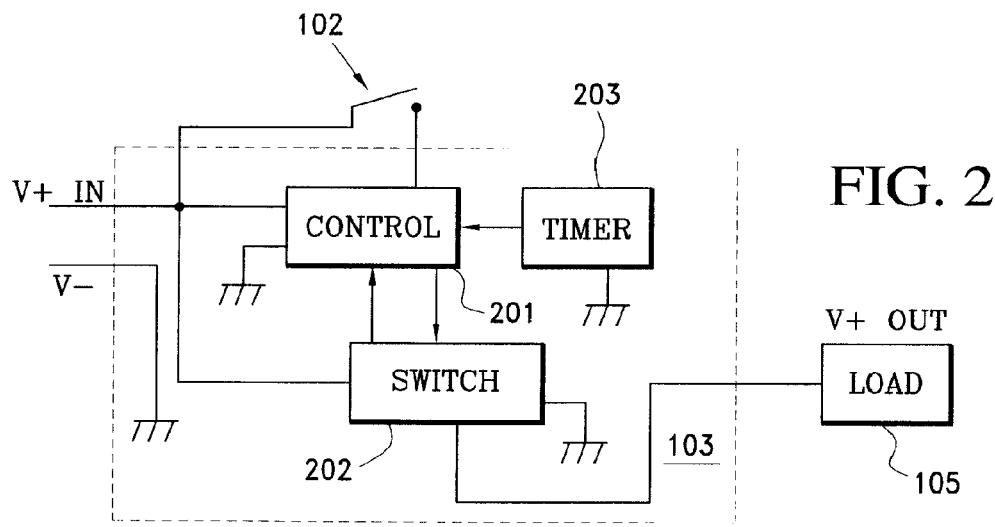
FIG. 2 is a block diagram of a microchip for use in association with a push button or sliding input activation/deactivation switch according to one embodiment of the invention.

In FIG. 15, microchip 1503 does not contain a current switch (e.g. switch 102) as shown in FIG. 2. However, if desired the regulator and relay can be integrated into a single monolithic microchip 1503. In case of a 12V (DC) local voltage this may be done in any event unless the current/power considerations is too high to make it practical.

In another embodiment, the microchips 1403 and 1503 are adapted to receive commands not only via the MMI input but also over the load power (electricity) wiring. This would allow a central controller 1506 to send out various commands to various power points, controlled by a microchip according to this invention, by using address information of specific microchips or using global (to all) commands.

Referring again to FIG. 1, and this being done purely for the sake of example, the microchip 103 is activated by sliding or activating a switch 102. It is apparent that different switches can be provided for different functions of the microchip. However, in order to enhance the user-friendliness of the device, a single switch may be capable of controlling different functions of an appliance such as a flashlight to which the microchip is mounted.

Assume for the sake of example that the switch 102 is used to turn the microchip on in the sense that a flashlight is turned on. A switch 110 may then be used at any time to turn the flashlight off, by appropriately controlling operation of the microchip. This is a conventional approach to controlling operation of the microchip. As an alternative the operation of the switch 102 can be sensed by means of a timing device 112. The timing device is started when the switch 102 is closed and after a short time period, say on the order of 5 seconds or less, which is measured by the timing device, the mode or function of the switch 102 changes so that, upon further actuation of the switch 102, the switch duplicates the function of the switch 110 which can therefore be dispensed with. Thus, initially the switch 102 functions as an on-switch while, a short period after its actuation, the switch 102 functions as an off-switch. It follows that with minor modifications to the circuitry of the microchip a single switch can exhibit multi-mode capabilities with the different modes being distinguished from each other or being exhibited on a time basis or, if necessary, on any other basis.

Multimode capabilities can for example be incorporated in a microchip wherein the function of a switch is also linked to time. In this sense the word "function" means the action which ensues or results upon the detection of the closure of the switch. For example a single switch may, from an off state of a flashlight, enable (a) the switching on of the flashlight and (b) the selection of one of a number of various modes like dimming level, flashing rate/sequence etc. when the switch is closed a number of times.

If however a certain time is allowed to pass (say five seconds) without any further closure of the switch taking place (indicating a mode has been selected), the function resulting from the next closure may be changed. Thus instead of selecting another mode, the closure may be interpreted as an "off" command.

In other words a sequence of switch closures within five seconds of each other will continue to step the microchip through a number of predefined modes. However should at any stage a time of more than five seconds elapse between consecutive presses or closures of the switch then the next switch operation will switch the flashlight off rather than stepping the microchip to another mode.

Clearly these characteristics are not confined to the use of the chip with a flashlight for the chip can be used with other applications to vary the mode of operation thereof in an analogous way. Thus, for the flashlight, the function of the switch will affect the operation of the flashlight in a manner which is dependent on the time period between successive actuations of the switch. More generally, in any electrical device which is controlled by means of the microchip the operation of the device will be regulated by the function which is exhibited by a switch which is in communication with the microchip. The switch function in turn is dependent on the duration of a time period between successive operations of the switch.

Other modes can also be exhibited by a single switch. For example, depending on requirement, a switch can be used for on and off operation, for initiating the transmission of an emergency signal, for initiating the gradual dimming of a flashlight or the like. The scope of the invention is not limited in this regard.

In the preceding description reference has been made to a touch sensor and to a non-latching push button or latching MMI switch. These components and technologies relating thereto may be combined in certain embodiments to achieve specific operational features that may be attractive to the user in that certain comforts or user friendliness may be facilitated.

In certain embodiments the touch sensor interface/switch 106 (see FIGS. 4 and 6) that allows the user to operate and select functions may also allow the user to select or give a signal to the microchip 103 based on proximity and not necessarily physical touch or contact. This feature is an inherent characteristic of some touch sensor or touch pad technologies, for example of the type described in U.S. Pat. Nos. 5,730,165 and 6,466,036.

It is then also feasible to define a user interface that accepts both touch sensor signals as well as electromechanical switch and specifically push button switch signals. The signals may be used to select the same functions or in some embodiments the different MMI technologies may be used to select different functions or operational modes.

In a specific embodiment in accordance with the general concepts of this invention, a module comprises the energy consuming load 105 (for example a bulb, LED or other light generating element), and the microchip 103, which in accordance with principles already described controls the various functions or operational modes at least in response to signals received from the touch sensor and (traditional) switch interfaces as well as a find-in-the-dark (FITD) indication. The FITD indication may be the energy consuming load 105 or another separate element creating a visible, audible or other human detectable signal that would assist a person to locate a product containing the abovementioned elements or the MMI switch in particular, for example in the dark.

An example, that is not to be regarded as limiting the scope of this invention, may be an interior light for passenger convenience of an automobile or other transportation vehicle such as a boat or a plane.

In one embodiment the interior (courtesy) light is interfaced with the user (MMI) via either a touch sensor and/or an electromechanical switch, such as a push-to-make (push button) type switch, hereinafter called a pb switch. The interior light can be placed in various operational modes and functions under control of the microchip 103: for example the arrangement may provide an automatic delayed shut off function; and a FITD indicator function that also gives an indication of inputs which are received via the MMI interface and which enables the selection of an operational mode based on the various activation and/or deactivation (of the MMI switch) time sequences.

In another embodiment of this example the module comprising the light generating element, the microchip 103 and the FITD indicator have at least a pb MMI as well as a touch sensor MMI. The latter may be a capacitive technology based sensor as is known in the art (See for example the disclosures in U.S. Pat. Nos. 5,730,165 and 6,466,036). This touch sensor is capable of giving an indication of, for example, a human hand being in the proximity of the sensor even if no physical contact between the sensor and the hand is made.

As an example of possible operation, the microchip 103 may use the signals received from the touch sensor indicating proximity of part of the body of the user, such as a hand, to activate the FITD indicator in a way that is different from when no proximity detection is occurring. Thus the FITD indicator that is normally off or flashing with a low duty cycle or activated in a low energy mode, may be activated in a constant on mode of a higher energy level. It is also possible in an embodiment to control the energy level, and hence the intensity of light or sound of the FITD indicator in some relationships to the proximity distance, say the closer the hand, the brighter or more intense is the FITD indicator. The FITD indicator may be part of the button to be pressed when activating the pb switch.

This proximity based FITD indication may continue for a period of time and may be discontinued a certain period of time after the proximity signal has disappeared. Of course the operation may be simpler and the proximity signal may be an indication upon which the microchip activates the FITD indicator for a predetermined period, at a predetermined level or only while the user is within a given proximity and the proximity signal is present.

If the user then proceeds and activates the pb MMI switch, the FITD indicator in a preferred embodiment may be deactivated or switched to another level or functional mode under control of the microchip, and the main energy consuming load may be activated by this pb switch activation. The microchip controlling the operational modes may, in a preferred case, be integrated with the microchip interpreting the MMI signals and realizing the touch sensor implementation.

Both the touch sensor and the pb switch signals may be interpreted in terms of time duration of activation and/or deactivation signals and/or sequences of signals.

In simple terms the physical switch (pb) surface that a user must press, may glow (in the dark) when the user brings his/her hand close to the switch. Specific illumination of the pb switch, under these conditions, assists the user in the location of the switch that must be activated in order to start operation. The pb switch in a specific embodiment must still be pressed to activate the light or main energy consuming load.

The FITD indicator may also be active (at a higher level) after an automatic shut-off has occurred or at least for a short period thereafter.

In another embodiment the activation by proximity results in a different operational mode or for a different time duration than activation by the pb switch.

In a specific embodiment the switching circuit including a module which houses or comprises the pb switch, the touch sensor, the microchip, the energy consuming load and a FITD indicator that is active when the load is not activated by the user. All the elements may be in close proximity of each other. In another embodiment the elements are each attached to and/or enclosed in the module which may be of any suitable shape or form which depends, at least, on the specific application.

The energy consuming load may for example, but not limited to, be an electric motor, a light generating element or a heat generating unit. The power source may be mains power or an exhaustible power source such as a battery or a fuel cell.

In a further embodiment, in accordance with a preceding description, the microchip controls an automatic delayed shut-off function resulting in the load being deactivated a predetermined period after it was activated. The microchip also gives a warning of such imminent shut-off a short period prior to the shut-off. This advance auto shut-off warning may be a single indication, a reduction in power and/or a sequence or repetitive sequence of warning indications. In a specific embodiment the microchip accepts a proximity signal as enough or sufficient indication that the user wishes to extend operation. This may be specifically during or after the warning signals have been activated. In simple terms, for example, once the warning has been given that auto-shut-off is imminent, but before auto-shut-down occurs, the user can reset the auto-off timer by the wave of a hand past the sensor and an actuation of the pb switch is then not necessarily required to extend the period of operation. Feedback may be given to the user that the extension of operation has been accepted by varying operation of the load or some other indication. An example may be that during the advance auto-off warning period the power to the load is reduced and upon resetting the timer, the original power level is restored. In a variation of this embodiment the FITD indicator that operates in response to the proximity signal(s) also gives an indication of the power source level. For example an activating/deactivating sequence or varying colors may be used to indicate the power level.

The combined touch sensor and pb switch technology may also be used in a headlamp or flashlight technology. Again proximity may activate the load or FITD indicator. The load may for example be activated at a reduced power level, or any activation may only be for a very short period of time. In some embodiments the proximity or touch sensor may be used for some commands but not for others, for example in a specific embodiment the touch sensor may not activate or deactivate the flashlight but it can cancel an imminent auto-shut-down. The same techniques can be implemented for the interior light (or map light) in a vehicle.

It is also possible that the pb switch can affect or activate functions concerning the general operation of the touch sensor. For example, the touch sensor may be forced to adjust its calibration by activations of the pb switch.

In another embodiment a power source (battery) level indicator may be activated whilst a proximity signal is active. This may enable a person to immediately notice the battery level when a product such as an electric tooth brush, shaver, flashlight or other battery operated product is picked up. Again, this indication may be switched off after a period of time. It is also possible that a low power indication or warning is given only when a proximity detection is made, to specifically stand out, when the proximity sensor is triggered.

In a further embodiment the electronics for the proximity touch sensor and a find-in-the-dark indicator are embedded in the casing of a traditional switch mechanism. This may be for example a switch for the defrosting of a window in a vehicle, a turn signal indicator activation mechanism or a window wiper activation lever. When the proximity of a body part (e.g. finger) or another element is detected, the find-in-the-dark indicator is activated in a mode different from normal. For example, it may be normally off and upon the proximity detection the find-in-the-dark indicator may be activated; or it may normally be on in a low mode and upon the proximity detection, the find-in-the-dark indicator may be activated in a higher power or more prominent mode. The find-in-the-dark indicator may be specifically designed to illuminate the contact area of the switch in the vicinity where the user must physically make contact to activate the switch. In some cases, e.g. a lever used to operate a wiper or turn signal indicator, the illumination may be on a front side of the lever to be visible, whilst the contact from the user may be from the bottom, top, side, back or any other direction. An important aspect is that the location of a specific selection mechanism, which enables a specific function to be activated, is indicated to the user before the mechanism is actuated. Alternatively expressed the specific function to be activated by a specific selection mechanism is indicated to the user before the function is selected. This may help prevent accidental activation of a wiper when a turn signal was desired and vice versa. Of course another indication (e.g. audio) may also be used to alert the user as to what switch is being approached or in proximity of a body part. In each instance a second indicator can be used in place of the FITD, or in addition to the FITD. The second indicator is under the control of the microchip and is used to give the user information about a switch near, or combined with, the proximity detection sensor.

It is also proposed that the proximity switch be used to guide the user towards a button or a sequence of buttons likely to be operated next. For example if a radio is installed with this invention and in an off state, the detection of a user finger in proximity of the radio will illuminate the on switch and possibly no other switch, whereas a proximity detection when already on, will illuminate the off switch or volume control switch but not the on switch. In a sense this invention will intuitively lead the user through the next logical options when the switches are approached.

It is also possible for a function or load be temporally selected, say whilst the proximity detection is made, but to activate the load permanently or for an extended period of time even if the proximity detection is cancelled, the pb switch must be operated.

The aforementioned functions also apply to a mains system with a mains switch fitted with a find-in-the-dark indicator and touch sensor interface or with mains and the system as described previously (FIGS. 14, 15) wherein dc Voltage is used to interface with the user and this switch, that is typically a pb switch, is then augmented with a touch sensor interface that functions in combination as described above.

It is also possible for the touch sensor proximity interface plus electronics to control some of the other described functions to be built into a traditional type switch that is for example typically found in a car or in a house. In some embodiments the touch sensor may switch the load on but not off or vice versa.

While the preferred embodiments of the present invention have been described in detail, it will be appreciated by those of ordinary skill in the art that further changes and modifications may be made to the embodiments without departing from the spirit and scope of the present invention as claimed.

What is claimed is:

1. A user interface it integrated with an electronic device, the user interface comprising:
    first and second touch sensor switches; and
    a microchip configured to indicate information provided by the electronic device in response to the first touch sensor switch being turned on independently of the second touch sensor switch,
    wherein the microchip is further configured to perform a function of the electronic device independent of the indicating the information provided by the electronic device, the function being different from the indicating the information provided by the electronic device, in response to the second touch sensor switch being turned on independently of the first touch sensor switch.

2. The user interface of claim 1, wherein the function of the electronic device comprises indicating information about a mode of at least one function of the electronic device.

3. The user interface of claim 1, wherein a unit current required to turn on the first touch sensor switch is lower than a unit current required to turn on the second touch sensor switch.

4. The user interface of claim 1, wherein the microchip is configured to distinguish a first input to the first touch sensor switch to turn on the first touch sensor switch from a second input to the second touch sensor switch to turn on the second touch sensor switch, and
    wherein each of the first and second inputs is one of capacitance change by an object with respect to the first or second touch sensor switch and a physical touch on the first or second touch sensor switch.

5. The user interface of claim 4, wherein a unit current required to turn on the first touch sensor switch is lower than a unit current required to turn on the second touch sensor switch.

6. The user interface of claim 1, wherein the microchip is further configured to provide a low power indication in response to detecting a low power status of the electronic device.

7. The user interface of claim 1, further comprising a switch configured to completely turn off the electronic device at any time.

8. A method of controlling a user interface integrated with an electronic device, the user interface comprising first and second touch sensor switches and a microchip configured to control functions of the first and second touch sensor switches, the method comprising:
    indicating, by the microchip, information provided by the electronic device in response to detecting the first touch sensor switch being turned on independently of the second touch sensor switch; and
    controlling, by the microchip, to perform a function of the electronic device independent of the indicating the information provided by the electronic device, the function being different from the indicating the information provided by the electronic device, in response to detecting the second touch sensor switch being turned on independently of the first touch sensor switch.

9. The method of claim 8, wherein the function of the electronic device comprises indicating information about a mode of at least one function of the electronic device.

10. The method of claim 8, wherein each of the first and second touch sensor switches is turned on by one of capacitance change by an object with respect to the first or second touch sensor switch and a physical touch on the first or second touch sensor switch.

11. An electronic device comprising a load, a power source or connection and a user interface which comprises a microchip and a switch coupled to the microchip,
    wherein the switch is configured to activate the microchip to control flow of power from the power source or connection to the load,
    wherein, in response to an input to the user interface, the microchip is configured to activate at least one function or mode of the electronic device without activating the load; and
    wherein the microchip is further configured to activate a specific function or mode of the electronic device based on a time duration of pressing or activating the switch.

12. The electronic device of claim 11, wherein the microchip is configured to activate a first function or mode of the electronic device in response to a first time duration of pressing or activating the switch, and activate a second function or mode, which is different from the first function or mode, of the electronic device in response to a second time duration of pressing or activating the switch which is longer than the first time duration.

13. The electronic device of claim 12, wherein the second function or mode is a turning-off function or mode of the electronic device.

14. The electronic device of claim 13, wherein the first function or mode is indicating at least one of a state or condition of the electronic device and a level of the power source.

15. The electronic device of claim 14, wherein the switch is a touch sensor switch or a physical push button switch.

16. The electronic device of claim 11, wherein the microchip is configured to adjust a level of the power from the power source to the load.

17. The electronic device of claim 11, wherein the microchip is configured to control gradual dimming of a light source included in the load.

18. The electronic device of claim 11, further comprising an indicator to be used to locate the electronic device in a dark environment,
wherein the microchip is configured to control automatic shut-off of the load after a predetermined period of time of no input to the user interface, and
wherein the microchip is further configured to maintain activation of the indicator after the load is automatically shut off.

19. An electronic device comprising a load, a power source or connection and a user interface which comprises a microchip and a switch coupled to the microchip:
wherein the switch is configured to activate the microchip to control flow of power from the power source or connection to the load,
wherein, in response to at least one input to the user interface, the microchip is configured to activate at least one function or mode of the electronic device without activating the load; and
wherein the microchip is further configured to activate the load in response to an input to the user interface, control automatic shut-off of the load after a predetermined time of no input to the user interface, and generate a signal to indicate that the automatic shut-off is imminent.

20. The electronic device of claim 19, wherein the microchip is configured to, in response to another input to the user interface, cancel the imminent automatic shut-off and restore a level of the power reduced due to the imminent automatic shut-off back to a previous level before the imminent automatic shut-off.

21. The electronic device of claim 19, further comprising an indicator to be used to locate the electronic device in a dark environment,
wherein the microchip is further configured to maintain activation of the indicator after the load is automatically shut off.

22. A method of controlling an electronic device comprising a load, a power source or connection and a user interface which comprises a microchip and a switch coupled to the microchip, the method comprising:
controlling the switch to activate the microchip to control flow of power from the power source or connection to the load; and
in response to an input to the user interface, activating at least one function or mode of the electronic device without activating the load; and
activating a specific function or mode of the electronic device based on a time duration of pressing or activating the switch.

23. The method of claim 22, wherein the activating comprises:
activating a first function or mode of the electronic device in response to a first time duration of pressing or activating the switch; and
activating a second function or mode, which is different from the first function or mode, of the electronic device in response to a second time duration of pressing or activating the switch which is longer than the first time duration.

24. The method of claim 23, wherein the second function or mode is a turning-off function or mode of the electronic device.

25. The method of claim 24, wherein the first function or mode is indicating at least one of a state or condition of the electronic device and a level of the power source.

26. The method of claim 22, further comprising adjusting a level of the power from the power source to the load in response to an input to the switch.

27. The method of claim 22, further comprising controlling gradual dimming of a light source included in the load.

28. The method of claim 22, further comprising:
automatically shutting off of the load after a predetermined period of time of no input to the user interface; and
maintaining activation of an indicator after the load is automatically shut off,
wherein the indicator is included in the electronic device to be used to locate the electronic device in a dark environment.

29. A method of controlling an electronic device comprising a load, a power source or connection and a user interface which comprises a microchip and a switch coupled to the microchip, the method comprising:
controlling the switch to activate the microchip to control flow of power from the power source or connection to the load,
in response to at least one input to the user interface, activating at least one function or mode of the electronic device without activating the load; and
activating the load in response to an input to the user interface, controlling automatic shut-off of the load after a predetermined time of no input to the user interface, and generating a signal to indicate that the automatic shut-off of the load is imminent.

30. The method of claim 29, further comprising, in response to another input to the user interface, canceling the imminent automatic shut-off and restoring a level of power reduced due to the imminent automatic shut-off back to a previous level before the imminent automatic shut-off.

31. The method of claim 29, further comprising maintaining activation of an indicator, included in the electronic device and controlled by the microchip, after the load is automatically shut off.

\* \* \* \* \*